March 31, 1936. A. BELESON 2,036,169
SOLDERING TOOL
Filed Aug. 1, 1934 2 Sheets-Sheet 1
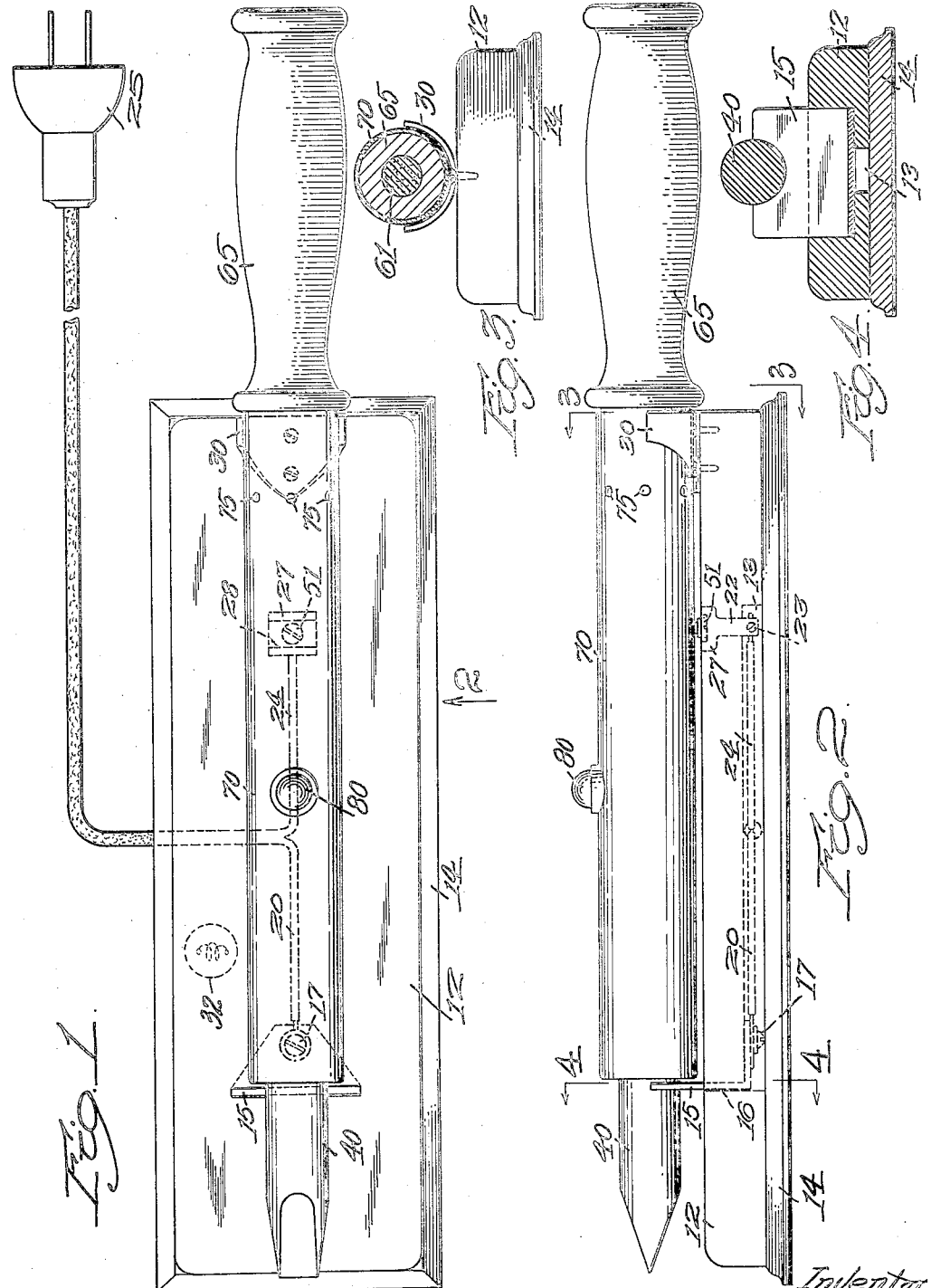
Inventor.
Abraham Beleson March 31, 1936.  A. BELESON  2,036,169
SOLDERING TOOL
Filed Aug. 1, 1934  2 Sheets-Sheet 2
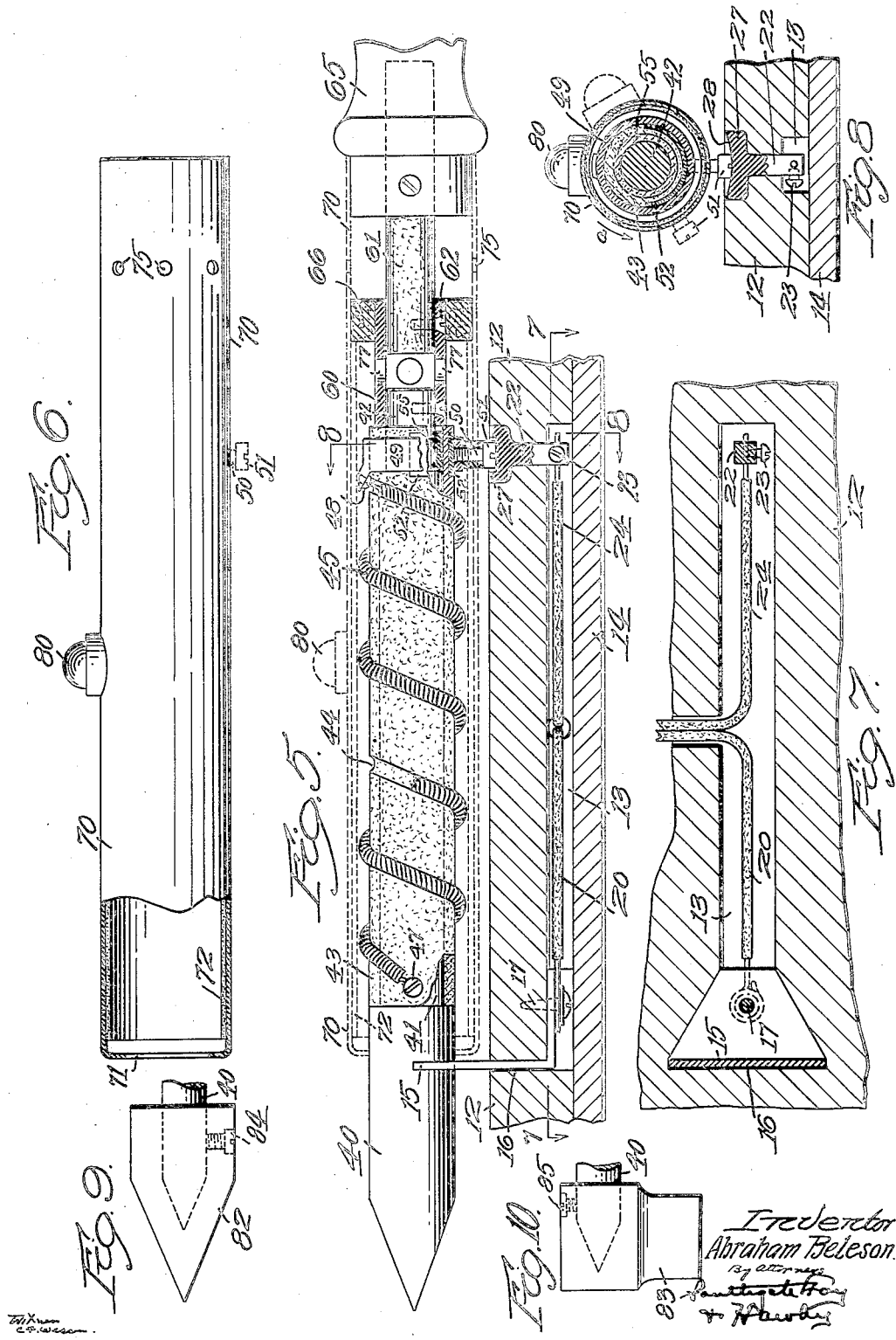
Inventor
Abraham Beleson Patented Mar. 31, 1936

2,036,169

UNITED STATES PATENT OFFICE 2,036,169

SOLDERING TOOL

Abraham Beleson, Worcester, Mass.

Application August 1, 1934, Serial No. 737,944

5 Claims. (Cl. 219—23)

This invention relates to a soldering tool intended for general purposes, and particularly to a soldering tool having provision for electric heating thereof.

It is the general object of my invention to provide an improved construction in an electrically heated soldering tool, by which construction simplicity and economy in manufacture may be attained, together with convenience and reliability in use.

A further object of my invention is to provide a soldering tool and a supporting stand therefor, so constructed that the tool will be in circuit when in one position on said stand and out of circuit when in a different position. The preferred construction is such that the tool may be readily shifted from one position to the other without lifting the tool or removing the tool from its supporting stand.

I further provide a construction in which the copper soldering point itself forms one contact element in the electric circuit.

My invention further relates to arrangements and combinations of parts which will be hereinafter described and more particularly pointed out in the appended claims.

A preferred form of the invention is shown in the drawings, in which

Fig. 1 is a plan view of my improved soldering tool and stand;

Fig. 2 is a side elevation thereof;

Figs. 3 and 4 are sectional end elevations, taken along the lines 3—3 and 4—4 in Fig. 2 respectively;

Fig. 5 is a sectional side elevation of my improved tool and stand;

Fig. 6 is a side elevation, partly in section, of the enclosing casing;

Fig. 7 is a detail sectional plan view, taken along the line 7—7 in Fig. 5;

Fig. 8 is a sectional end elevation, taken along the line 8—8 in Fig. 5, and

Figs. 9 and 10 are detail side elevations to be described.

Referring to the drawings, I have shown my improved soldering tool supported on a base 12, preferably formed of compressed asbestos or some other similar heat-resistant and non-combustible material.

The base 12 is provided with a recess 13 (Figs. 5 and 7) in its under side, and the recess is covered by a bottom plate 14 detachably secured to the base 12. An L-shaped terminal and support 15 (Figs. 4 and 5) projects upward through a slot 16 in the base 12 and is secured in position by a screw 17 which also acts as a binding screw to connect a wire 20 to the terminal 15.

A stud 22 (Fig. 5) is mounted in an opening in the base 12 and the inner end of the stud extends into the recess 13 where it is provided with a binding screw 23 by which the second wire 24 of the electric connections may be secured. The wires 20 and 24 may be connected at their other ends to an attachment plug 25, as indicated in Fig. 1.

The stud 22 preferably has a square shank as shown in Fig. 7, and has an enlarged rectangular end portion 27 (Figs. 1 and 5) with a transverse segmental recess 28 (Fig. 8) in its upper surface.

The base 12 is also provided with a semi-circular guide plate 30 (Figs. 1 and 3) by which the handle end of the soldering tool is positioned and held from displacement.

A small electric bulb or signal light 32 (Fig. 1) may be connected into the circuit if so desired and will be lighted whenever the tool is in position to heat. This light serves as a warning signal, so that the tool may not be left in heating position for an undesired length of time.

The details of construction of my improved soldering tool itself are best shown in Figs. 5, 6 and 8. The tool comprises a copper point 40 having a slightly reduced shank portion 41 and a still further reduced end portion 42. A sleeve 43 of compressed asbestos is snugly fitted on the shank portion 41 and is preferably provided with a helical groove 44 to receive and position a heating coil 45.

One end of the coil is directly connected to the shank 41 of the copper point 40 by a binding screw 47 (Fig. 5). The other end of the coil 45 is secured by a binding screw 48 to a collar 49 provided with a clamping screw 50 having an enlarged head 51. A semi-circular metal plate 52 is positioned in a recess in the end of the asbestos sleeve 43 to take the wear of the binding screw 50.

The end of the sleeve 43 projects beyond the shank 44 and over a part of the end portion 42. An asbestos bushing 55 (Fig. 5) is inserted between this projecting end portion of the sleeve 43 and the end portion 42 of the copper shank.

A metal sleeve 60 is secured to the extreme outer end of the portion 42, and a plug 61 of compressed asbestos is inserted in the outer end of the sleeve 60 and is secured therein by a screw 62. A handle 65 is mounted on the outer end of the plug 61 and may be of wood, fibre, or any other suitable material, or if desired the parts 61 and 65 may be made integral from compressed asbestos.

An asbestos collar 66 is mounted on the sleeve 60 and is of such size as to loosely fit the interior of a metal casing 70 (Fig. 6). This casing 70 has an opening 71 at one end, loosely fitting the copper point 40, and is provided with a lining 72 of asbestos or other heat-insulating material.

My improved soldering tool is very easily assembled by first putting together all of the parts shown in Fig. 5, with the exception of the casing 70. The binding screw 50 is then removed and the entire assembly, together with the handle 65, is inserted in the casing 70 from the right as viewed in Figs. 5 and 6. The screw 50 is again inserted through a suitable opening in the side of the casing 70, thus providing a second external contact or terminal for the coil 45 and also holding the casing 70 from displacement. The screw is properly insulated from the casing 70.

The casing 70 is provided with holes 75 between the handle 65 and the collar 66 for ventilating purposes, and the sleeve 60 is similarly provided with holes 77 so that heat from the end 42 of the copper point may circulate through the space between the sleeve 60 and the casing 70.

When my improved soldering tool is assembled as shown in Figs. 1 and 2, all parts of the electrical construction are concealed within the casing 70 and the chance of injury to the heating coil is reduced to a minimum.

When the soldering tool is placed on the stand 12, the copper point 40 makes direct contact with the support 15, which in turn is directly connected to the wire 20. The tool is held from transverse displacement by the guide plate 30, and when rotated as indicated by the arrow $a$ in Fig. 8, the head 51 of the binding screw 50 will enter the segmental groove 28 in the head of the stud 22, thus completing the electric circuit through the stud 22 and wire 24. When thus supported in operative position, the end of the casing 70 is slightly raised from the guide plate 30 as indicated in Fig. 2.

When it is desired to shut off the heating current but without removing the tool from the stand, the tool is simply turned angularly from the full line to the dotted line position in Fig. 8, thus moving the binding screw 50 out of engagement with the stud 22. It will be noted that it is not necessary to lift or displace the tool for this purpose, but merely to give it a slight angular turn.

A target 80 of colored glass or other suitable material may be mounted at the opposite side of the casing 70 from the binding screw 50, so that when the tool is in heating position the target 80 will be at the top, thus giving a further visual indication when the current is on. This target 80 may be used in addition to the light 32 previously described or in substitution therefor.

The only part of the tool subject to deterioration is the heating coil 45, which can be readily removed and replaced by loosening the binding screws 47 and 48.

My improved tool is found to heat rapidly, to retain heat for a comparatively long period, to be simple in construction and assembly, and to be very satisfactory in use.

In Figs. 9 and 10 I have shown auxiliary soldering points 82 and 83 which may be recessed to receive the copper point 40 and which may be secured thereon by binding screws 84 or 85. In this way a single soldering tool may be adapted for various types of work without requiring duplication of the heating apparatus.

Having thus described my invention and the advantages thereof, I do not wish to be limited to the details herein disclosed, otherwise than as set forth in the claims, but what I claim is:—

1. In combination, a soldering tool having a heating coil connected to two contact terminals in said tool, one of said terminals being positioned in the side of said tool, a supporting stand having contacts for engagement with said terminals when said tool is on said stand and in a predetermined angular position only with respect to the longitudinal axis of said tool, one of said contacts being out of engagement with its associated terminal in all other angular positions of said tool, and means to retain said tool on said stand in every angular position of said tool.

2. In combination, a soldering tool having a copper soldering point and having a heating coil connected at one end to said copper point and at the other end to an insulated contact terminal in the side of said tool, and a supporting stand for said tool having a contact element to support and laterally position said copper point and having a second contact element engageable by said insulated terminal when the tool is on said stand and in a predetermined angular position only with respect to the longitudinal axis of the tool.

3. In combination, a soldering tool having a heating coil connected to two contact terminals in said tool, and a supporting stand having means to laterally position a tool thereon and having contacts for engagement with said terminals when said tool is on said stand and in a predetermined angular position with respect to the longitudinal axis of the tool, one of said contacts being out of engagement with its associated terminal in all other angular positions of said tool but the other contact being continuously engaged as long as the tool is supported on said stand and also effective as additional lateral positioning means in every angular position of the tool.

4. In combination, a soldering tool having a heating coil, a supporting stand having spaced elements by which said tool is laterally positioned and in which said tool is angularly movable about the longitudinal axis of said tool, said tool having a heating coil therein, one end of said coil being electrically connected through one of said positioning elements, and additional means to complete a circuit through said coil in one angular position only of said tool with respect to the longitudinal axis of said tool and when said tool is on said stand.

5. In combination, a soldering tool having a casing, a copper soldering point and a heating coil in said casing connected at one end to the copper point of said tool and at the other end to a contact terminal in the side of said casing, a supporting stand for said tool having a contact element to engage said copper point and a second contact element engageable by the terminal in the side of said tool but only when the tool is on said stand and in a predetermined angular position with respect to the longitudinal axis of the tool, and means to retain said tool on said stand in every angular position of said tool.

ABRAHAM BELESON.